Sept. 4, 1956     W. H. COLBERT ET AL     2,761,945

LIGHT TRANSMISSIVE ELECTRICALLY CONDUCTING ARTICLE

Filed July 6, 1953

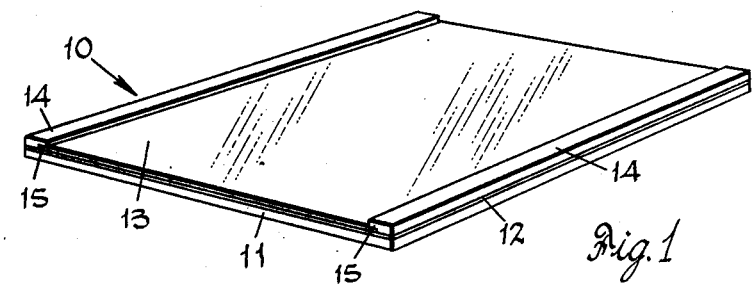

Fig. 1

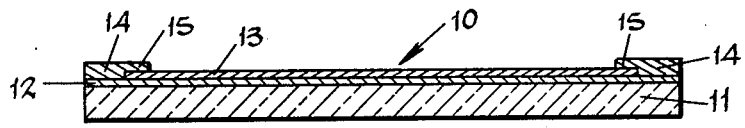

Fig. 2

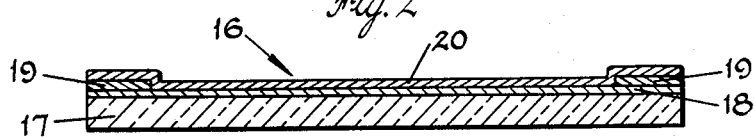

Fig. 3

| Ex | Adhesive Layer Mat'l | Thick. | Metal Film Mat'l | Thick. | Protective Coating Mat'l | Thick. | Elect. Resist. Ohms | Transparen. (%) | Ctd Side Rflt. | Unctd Side Rflt. |
|---|---|---|---|---|---|---|---|---|---|---|
| 1 | $Al_2O_3$ | 87 | Au | 48 | $Al_2O_3$ | 87 | 60 | 77 | 11 | 6 |
| 2 | $Al_2O_3$ | 14.5 | Au | 48 | $Al_2O_3$ | 207.5 | 50 | 70 | 5 | 6 |
| 3 | $Al_2O_3$ | 87 | Au | 48 | $Al_2O_3$ | 87 | 60 | 78 | 8.8 | 9.2 |
| 4 | $Al_2O_3$ | 7 | Au | 48 | $Al_2O_3$ $SiO_2$ | 7 225 | 30 | 72 | 12 | 6 |
| 5 | $Al_2O_3$ | 14.5 | Au | 40 | $Al_2O_3$ $SiO_2$ | 7 450 | 36 | 78 | 5 | 5.4 |
| 6 | $Al_2O_3$ | 14.5 | Au | 40 | $Al_2O_3$ $SiO_2$ | 7 450 | 30 | 76 | 10.6 | 11 |
| 7 | FeO | — | Au | 48 | $Al_2O_3$ $SiO_2$ | 7 225 | 35 | 74 | 8 | 4 |

Fig. 4

Inventors
William H. Colbert and
Willard L. Morgan
By Nobbe & Swope
Attorneys

United States Patent Office 2,761,945
Patented Sept. 4, 1956

2,761,945

LIGHT TRANSMISSIVE ELECTRICALLY CONDUCTING ARTICLE

William H. Colbert and Willard L. Morgan, Pittsburgh, Pa., assignors to Libbey-Owens-Ford Glass Company, Toledo, Ohio, a corporation of Ohio Application July 6, 1953, Serial No. 366,192

6 Claims. (Cl. 219—19)

This invention relates broadly to an improved light transmissive electrically conductive article suitable as a lens, a window, a vehicular windshield, or for other similar uses. More particularly, it relates to an article of the type described having an electrically conductive and light transmissive metal film which is protected from the effects of abrasion and erosion and operable to effectively pass relatively high currents therethrough.

The objects of this invention are in a broad sense similar to those of Patent No. 2,628,927, issued February 17, 1953, in providing an article with a transparent electrically conductive film designed to have an electrical resistivity of not more than 150 ohms per square while preserving a light transmission of not less than 50%. As noted in said patent, it has been found that only in the case of the metals gold, silver, copper, iron and nickel can films having these characteristics be properly adhered to a support body of glass or other siliceous material.

Whereas the aforementioned patent was concerned with the problem of obtaining proper adherence of the electrically conductive film to said support body, the present invention is more particularly concerned with the problem of protecting the film from scratching, abrasion, or the like and at the same time getting the relatively high currents frequently required in applications of this type into said film without causing the failure thereof.

The metals from which the thin electrically conductive films contemplated by this invention are formed are relatively soft. Scratching or erosion of these films will interfere with the passage of current therethrough and may actually cause a burning out of the film due to high localized concentration of current in the areas surrounding the scratch or eroded portion. Thus, it is herein proposed to provide the electrically conductive film with a transparent protective layer thereover of a dielectric inorganic material such as magnesium fluoride, aluminum oxide, or silica. In this manner, the possibility of the conductive film being scratched or eroded is minimized.

It is conventional practice to get current into the electrically conductive film by means of contact elements in the form of electrodes or "bus bars" which are placed at spaced locations on the article and act as terminals for the passage of said current through the film of the article. It has been proposed to secure these electrodes to the protective layer overlying the electrically conductive film and in such a case, it was found that when the protective layer was of a thickness less than a wave length in light, the normal porosity in said layer provided a suitable amount of electrical leakage therethrough from the electrodes to the electrically conductive film.

It has been found upon further study that this arrangement is satisfactory only when the power to be applied across the film is of a relatively small amount such as, for example, less than 200 watts per square foot of the film. Where the protective coating is made of extreme thinness, the number of porous areas or "pin holes" increases such that the slightly greater wattages might be handled. However, where relatively high wattages are to be used, as in the case for example of heaters and heating applications for vehicular windows requiring 600 to 5,000 watts per square foot, the concentration of the current through a few "pin holes" in the protective layer results in concentrating the electrical current flow into extremely small individual areas and a small total area. The very high current density resulting therefrom produces excessive localized heating under the electrodes at such "pin hole" locations and burning out of the conductive films occurs in these locations. As the "pin holes" are successively burned out, the current is restricted into fewer "pin holes" and smaller areas such that a condition of complete burn out of all paths of possible electrical flow from the electrodes, through the dielectric protective layer, and to the overlying electrically conductive film occurs and the article becomes inoperative.

According to the present invention, there is produced an article of the type described having a transparent protective layer applied over the electrically conductive and light transmissive film thereof, and in which electrodes are secured directly to said film and said protective layer is extended over the portions of said film lying between said electrodes. Thus, the improved article herein produced includes broadly a support body of glass or other transparent siliceous material, an electrically conductive and light transmissive metal film adhered to a surface of said support body, electrodes secured directly to said film at spaced locations thereon, and a hard transparent protective layer of dielectric inorganic material applied to and overlying said conductive film between said spaced electrodes.

In this manner, there is provided an improved article of the type described in which, according to the principal object of this invention, the electrically conductive film thereof is protected from the damaging effects of scratching and erosion while at the same time maintaining its ability to effectively carry relatively high wattages which are applied thereto without permanent damage to said film.

It is a more particular object of this invention to provide an improved article of the type described having a permanently protected metal film with an electrical resistivity of not more than about 150 ohms per square and a light transmission of not less than about 50%, and in which wattages of considerably greater than 200 watts per square foot of said film may be effectively applied thereto.

An ancillary object of this invention is to provide a novel means of applying electrodes directly to the electrically conductive film in a manner to produce a dense and tightly adherent contact therewith.

Other objects and advantages of the invention will become more apparent during the course of the following description.

In the accompanying drawings:

Fig. 1 is a perspective view of one form of the improved article of this invention;

Fig. 2 is a sectional view of the improved article of Fig. 1;

Fig. 3 is a view similar to Fig. 2 of another form of the invention; and

Fig. 4 is a tabular presentation of a number of specific examples of the articles produced in accordance with this invention.

Referring now to the drawings, the article shown in Figs. 1 and 2 and designated in its entirety by the numeral 10, includes a support body 11 of transparent glass or other transparent siliceous material having a thin film of metal 12 tightly adhered thereto and extending uniformly thereacross. As previously mentioned, it is desired, for the purposes of this invention and to be satisfactory for the uses to which the improved article is to be put, that this film possess an electrical resistivity of not more than about 150 ohms per square and a light transmission of not less than about 50%. As also mentioned, only in the case of the metals gold, silver, copper, iron and nickel, has it been found possible to produce films having the above characteristics.

The film 12 may be composed, for example, of an intermediate adhesive layer applied directly to the surface of the support body 11 and a film of any of the metals above-mentioned deposited thereover, as disclosed in the aforementioned patent. However, this invention is not particularly restricted thereto and encompasses within the term "light transmissive electrically conductive film" any and all types of films comprising any one of the aforementioned relatively soft metals in a thickness which will produce the desired light transmission and electrical resistivity characteristics. The film 12 may be applied to the support body 11 in any desired manner, and as more particularly described to follow, so as to produce tight adherence with the adjacent surface thereof.

There is then applied to all but two opposite spaced edge portions of the metal film 12 a hard transparent protective layer 13 of dielectric inorganic material, while electrodes 14 of silver, copper, or other suitable material used for this purpose are applied to the spaced exposed edge portions of the metal film. Thus, the electrodes 14 are applied directly to the metal film 12 for immediate electrical contact therewith and the protective layer 13 extends entirely between and immediately adjacent to the inner edges of said electrodes. If desired, and to insure the continuous contact of the protective layer and electrodes throughout the lengths thereof, the inner edge 15 of said electrodes may be permitted to overlap the adjacent ends of the protective layer, as shown in Fig. 1.

The article shown in Fig. 3 and designated in its entirety by the numeral 16, comprises a support body 17 and a light transmissive and electrically conductive metal film 18, similar to the body 11 and film 12 of the article 10 illustrated in Fig. 1. In this case also the electrodes 19 are applied directly to the metal film along two opposite edge portions thereof. However, as here shown, a protective layer 20 of a dielectric inorganic material is extended over the electrodes 19 as well as the portion of the metal film therebetween. Thus, in a manner similar to the article 10 in Figs. 1 and 2 the article 16 is provided with an electrically conductive metal film 18 having electrodes 19 applied directly to oppositely spaced edge portions thereof and a protective layer 20 extending in part entirely between said electrodes.

It is preferred that the electrically conductive films and the protective layers of the articles 10 and 16 be deposited upon the support bodies thereof by the direct thermal evaporation within a vacuum of small amounts of the materials making up said films or layers. Also, of course, if the electrically conductive films 12 and 18 be formed with an intermediate adhesive layer applied directly to the support body, said adhesive layer may also be deposited by thermal evaporation, such a process being more fully described in the aforementioned Patent No. 2,628,927.

It is apparent that the electrically conductive films and the protective layers could also be deposited upon the support bodies by other well known methods. For example, the adhesive layer of said film could be produced by sputtering in a residual vacuum and the metal film applied thereover by a sputtering operation in hydrogen or inert atmosphere. As well, the metal film could be chemically deposited upon its respective support body.

However, while it is not meant to impose a limitation upon the scope of this invention, the thermal evaporation process is preferred in depositing the coatings to form the novel article of this invention not only from the standpoint of results obtained but also from the standpoint of ease and efficiency of operation. More particularly, by means of a method and apparatus described in a copending application of Willard L. Morgan and Stephen H. Harwig, Serial No. 381,368, filed September 21, 1953, it has been found possible to successively deposit the coatings of this invention upon a support body during a single thermal evaporation process.

As described in said copending application, apparatus may be assembled within a thermal evaporation chamber and operable externally thereof for shielding or masking selected portions of a support body surface during the application of successive coatings thereto. That is, by means of this shielding apparatus, a first coating may be applied to a first selected portion of said surface and a second coating subsequently applied to a second selected portion thereof without the necessity of interrupting the thermal evaporation process. The advantages in time and effort to be obtained from such a method will be readily understood by one skilled in the art.

For example, a shielding apparatus may be disposd within, but operable from without, the chamber for masking the edge portions of the electrically conductive film 12 (Figs. 1 and 2) just prior to the deposition of the protective layer 13 thereover. That is, the support body 11 could be first disposed within the chamber and the film 12 deposited entirely thereover by conventional thermal evaporation methods. Subsequent to the deposition of the film 12, however, the shielding apparatus could be actuated from its remote control to move into masking position over the marginal edge portions of the film and between the support body 11 and sources of thermally evaporable material to be deposited thereon.

At this time, the protective layer 13 could be deposited upon the portion of the film 12 lying between said shielding apparatus. Subsequent thereto, the shielding means could be removed and the electrodes 14 applied directly onto the previously masked out edge portions of the film 12. As shown in Figs. 1 and 2, portions of the electrodes may overlap as at 15 slightly onto the adjacent edges of the protective layer 13. In fact, a certain amount of overlap is almost inevitable. It will be understood, however, that this has no adverse effect on the electrical conductivity of the article and for that matter would seem to be a means of insuring that all portions of the film 12 are covered.

If desired, the electrodes 14 may also be deposited by thermal evaporation by the use of additional shielding apparatus within the evaporation chamber. That is, the shields for masking the edge portions of the film 12 may be moved to an inoperative position and another shield moved into position over the just-deposited protective layer 13. At this time, the electrodes 14 may be deposited by thermal evaporation onto the marginal edge portions of the film 12 at both sides of the centrally located shield.

Alternatively, after the protective layer 13 has been deposited upon all but the edge portions of the film 12, the article 10 may be removed from the thermal evaporation chamber and the electrodes 14 applied thereto by other means. For this purpose, the electrodes may be made of silver deposited on said edge portions from a silver pigment containing resinous ink of lacquer. Also, the silver electrodes may be deposited by means of a chemical reaction which would result from the article being placed on edge in a limited depth of ordinary silver mirror forming solution, such as alkaline silver nitrate and dextrose poured therearound.

It has been found further that the chemically deposited electrodes may be more tightly adhered directly to the film 12 by a baking operation. Thus, after being deposited upon said film, the electrodes 14 are preferably baked at about 150° F. or more for at least 16 hours. While it is not certain as to the chemical reaction that takes place, it is thought that the baking causes slight oxidation of the metallic electrode. At any rate, the greatly improved adherence of the electrode to the electrically conductive film, and thus the increased efficiency of the completed article, has been clearly demonstrated.

Similar shielding apparatus may be employed within a thermal evaporation chamber for producing the article 16 of Fig. 3. Thus, the support body 17 thereof may first be disposed within said chamber and the electrically conductive film 18 deposited thereover in a conventional manner. In this case, however, the shielding apparatus for masking the central portions of the film 18 are first moved into operative position. In this manner, the electrodes 19 may be deposited by thermal evaporation directly onto only the edge portions of said film.

Subsequent to the deposition of the electrodes 19, the central shielding apparatus may be moved out of operative position so as to expose the entire width of the article 16 to the sources of thermally evaporable material from which the protective layer 20 is to be formed. Thus, at this time, the article 16 will be related in an unobstructed position with respect to the thermal evaporation sources, as it was just prior to the deposition of the electrically conductive film 18. When the protective layer 20 is laid down upon said unshielded article, it will cover the electrodes 19 as well as the portion of the film 18 extending therebetween, as shown in Fig. 3. On the other hand, small masked areas protecting against deposition of the protective layer 20 on small areas on each electrode may be found useful as points for attaching current lead wires.

Of course, if desired, conventional masking apparatus as well as other methods of coating the articles may be used. For example, the portions of the articles to be coated may be covered with strips of suitable masking tape or the like, in which case the application and removal thereof between successive coatings would necessitate interrupting the thermal evaporation process. However, as previously mentioned and as more fully described in the aforementioned copending application, the use of remotely operable shielding apparatus is preferred as it has proven especially satisfactory in producing the articles of this invention by a thermal evaporation coating method.

Fig. 4 contains a tabulation of exemplary electrically conductive films and protective layers therefor, each of which is described hereinbelow. It will be understood, however, that neither the composition of these articles nor their electrical and optical properties are meant to be limiting factors on the scope of this invention. As well, it will also be understood that the electrodes or "bus bars" may be applied to the exemplary articles in the manner previously described. Inasmuch, however, as their physical properties do not materially affect the operation of the overall article, they have not been noted.

*Examples 1 to 3*

By successive thermal evaporations within a vacuum, a coating comprising aluminum and gold films was built up on each of two sheets of glass in two separate coating runs. After the deposition of this electrically conductive film, and without breaking the vacuum, edge shielding apparatus was moved into masking position over spaced edge portions of said coating. With said shielding apparatus in position, still another coating of aluminum was deposited upon the gold film, after which the coated article was removed from the thermal evaporation chamber.

Upon one glass sheet, the first aluminum layer was 56 Angstrom units thick, the gold film applied thereto was 48 Angstrom units thick, and the uppermost second aluminum coating forming the protective layer was 56 Angstrom units thick. On the second sheet, these coatings were, respectively, 9.3, 48, and 133 Angstrom units in thickness.

The first coated sheet was placed in a furnace at 700° F. for 16 hours in order to permit oxygen to penetrate through the superimposed layers and thereby convert each of the aluminum layers to aluminum oxide. Similarly, the second coated sheet was put in a furnace at 800° F. for one-quarter hour for the same purpose. Thus, in each case, the resultant article was an electrically conductive, light transmissive sheet of glass having a gold film adhered thereto by an aluminum oxide layer, the outer surface of the gold film being protected by a hard aluminum oxide layer. The thicknesses of the layers subsequent to the oxidation process are shown in Fig. 4, Examples 1 and 2 being constituted of the first sheet and thus exhibiting identical coating thicknesses and resistivity.

Electrodes were applied to the shielded edge portions of the gold film of the first sheet in the manner previously described. This sheet then had an uncoated sheet of glass laminated to its coated surface by means of a soft plastic innerlayer of approximately 1.5 refractive index. The safety glass thus formed is represented in Fig. 4 as Example 3, wherein the transparency is indicated as 78%, the reflectivity from the coated side thereof as 8.8%, and from the uncoated side as 9.2%. On the other hand, the laminated product of Example 3 showed the same electrical resistance of 60 ohms as in Example 1.

*Examples 4 to 6*

By thermal evaporation in a vacuum, two sheets of glass were prepared with successively applied coatings of metallic aluminum and gold. In a manner previously described and without breaking the original vacuum, a shielding apparatus was moved into position to mask the central portions of the gold film and silver electrodes were deposited by thermal evaporation upon the exposed edge portions of said film at opposite sides of said apparatus. While still maintaining the vacuum and from control mechanism actuated remote from the chamber, the centrally disposed shield was moved to an inoperative position, and further coatings of metallic aluminum and silica were deposited over the silver electrodes as well as the exposed central portions of the gold film disposed therebetween.

These two coated sheets were then removed from the vacuum chamber, at which time the first sheet was heated in air for one-quarter hour at 800° F., whereby the aluminum layers were converted to aluminum oxide and were each taken to be 7 Angstrom units thick. The gold film employed was 48 Angstrom units thick and the outer protective silica layers 225 Angstrom units thick. The article thus formed, and designated as Example 4, showed an electrical resistance of 30 ohms, a light transmission of 72%, and other physical properties as shown in Fig. 4.

The second sheet was similarly heated but at a temperature of 1000° F., and the aluminum oxide layer adjacent the glass sheet and forming the adhesive layer for the gold film was found to be 14.5 Angstrom units thick, the gold film 40, and the protective layer of aluminum oxide 7 Angstrom units thick. The outer layer of silica upon the protective aluminum oxide layer was 450 Angstrom units thick. This article, designated as Example 5, exhibited the properties listed opposite the same in Fig. 4.

This same second sheet was then laminated into a safety glass in which the plastic innerlayer was placed adjacent the coated surface of the article. The final product exhibited substantially the same properties as are listed for Example 6 in Fig. 4.

*Example 7*

A vacuum chamber was preliminarily coated with iron upon its walls by thermally evaporating iron within said chamber. It was then opened and clean glass sheets were placed therein and the chamber evacuated to a sputtering pressure. A high voltage A. C. electric current was applied to the iron coated walls of the chamber which acted as one electrode and to the insulated aluminum disks acting as the second electrode. After ten minutes of sputtering, a thin invisible coating of iron oxide had been deposited upon the glass. The vacuum was then pulled down to a pressure suitable for thermally evaporating a small quantity of gold so as to produce upon the glass and over the adhesive layer of iron oxide a coating of gold having a thickness of 48 Angstrom units. At this time and in the manner previously described, a shielding apparatus was remotely actuated and moved into masking position over the edge portions of the coated glass sheets. With the shielding apparatus so positioned, protective layers of metallic aluminum and silica were successively deposited upon the gold film, after which the coated article was removed from the chamber. The layer of aluminum was converted to aluminum oxide by heating in air at 800° F. for one-quarter hour. The final protective layer was thus composed of a layer of aluminum oxide of 7 Angstrom units thick and a silica layer of 225 Angstrom units thickness.

The article so produced exhibited an electrical resistance of 35 ohms and a transparency of 74%, as shown with respect to Example 7 of Fig. 4. The coated side of the article showed a reflectivity of 8% while the uncoated side was 4% reflective.

We claim:

1. An electrically conductive light transmissive article comprising, a transparent support body, a light transparent metal film permanently adhered to one entire surface of said support body, a relatively hard transparent protective coating covering said metal film and terminating inwardly of opposed marginal edge areas thereof, and a highly electrically conductive material applied as an electrode over the exposed marginal edge areas of the metal film in direct contact therewith and overlapping the protective coating above a portion of a major surface area of the metal film.

2. An article as defined in claim 1 in which the metal film is gold.

3. An article as defined in claim 1 in which the metal film is copper.

4. An article as defined in claim 1 in which the metal film is silver.

5. An article as defined in claim 1 in which the metal film is nickel.

6. An article as defined in claim 1 in which the metal film is iron.

References Cited in the file of this patent

UNITED STATES PATENTS

| | | |
|---|---|---|
| 2,256,642 | Gaut et al. | Sept. 23, 1941 |
| 2,507,036 | McCrumm et al. | May 9, 1950 |
| 2,569,773 | Orr | Oct. 2, 1951 |
| 2,614,944 | Lytle | Oct. 21, 1952 |
| 2,628,299 | Gaiser | Feb. 10, 1953 |
| 2,628,927 | Colbert et al. | Feb. 17, 1953 |